(12) United States Patent
Bannister (10) Patent No.: US 8,409,317 B2
(45) Date of Patent: Apr. 2, 2013

(54) FILTER ASSEMBLY WITH HOUSING STRUCTURE

(75) Inventor: Robert A. Bannister, Stoughton, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 375 days.

(21) Appl. No.: 12/828,475

(22) Filed: Jul. 1, 2010

(65) Prior Publication Data

US 2011/0083409 A1    Apr. 14, 2011

Related U.S. Application Data

(60) Provisional application No. 61/251,012, filed on Oct. 13, 2009.

(51) Int. Cl.
*B01D 46/00* (2006.01)
(52) U.S. Cl. .............................. 55/503; 55/502; 210/450
(58) Field of Classification Search .................... 55/502, 55/503, 504; 210/450
See application file for complete search history.

(56) References Cited

U.S. PATENT DOCUMENTS

| | | |
|---|---|---|
| 5,685,985 A | 11/1997 | Brown et al. |
| 5,871,645 A | 2/1999 | Reed et al. |
| 6,358,292 B1 | 3/2002 | Clements |
| 6,402,798 B1 | 6/2002 | Kallsen et al. |
| 6,436,162 B1 | 8/2002 | Wake et al. |
| 6,569,219 B1 | 5/2003 | Connor et al. |
| 6,958,083 B1 | 10/2005 | Schmitz et al. |
| 7,070,642 B2 * | 7/2006 | Scott et al. ...................... 55/498 |
| 7,413,588 B2 | 8/2008 | Holzmann et al. |
| 7,614,390 B2 | 11/2009 | Holzmann et al. |
| 2004/0261383 A1 | 12/2004 | Schaerlund et al. |
| 2007/0158917 A1 | 7/2007 | Paykin |
| 2008/0104794 A1 | 5/2008 | Greene et al. |
| 2009/0057219 A1 | 3/2009 | Bagci et al. |

* cited by examiner

*Primary Examiner* — Robert Clemente
(74) *Attorney, Agent, or Firm* — Andrus, Sceales, Starke & Sawall, LLP (57) ABSTRACT

A filter assembly for filtering fluids includes a housing having a base and a cover having guide structure for assembly. The guide structure may also provide gasket retention.

10 Claims, 7 Drawing Sheets

FILTER ASSEMBLY WITH HOUSING STRUCTURE

CROSS-REFERENCE TO RELATED APPLICATION

This application claims the benefit of and priority from provisional U.S. Patent Application No. 61/251,012, filed Oct. 13, 2009, incorporated herein by reference.

BACKGROUND AND SUMMARY

The invention relates to filter assemblies for filtering fluid through a filter element contained in a housing having a base and a cover.

The invention arose during continuing development efforts directed toward filter assemblies for filtering fluid through a filter element contained in a housing having a base and a cover. Housing structure is provided.

DETAILED DESCRIPTION

FIGS. 1-4 show a filter assembly 20 for filtering fluid received at inlet 22 as shown at arrow 24, and discharging clean filtered fluid at outlet 28 as shown at arrow 30. The assembly includes a housing 32 provided by a base 34 and a cover 36, which may be held together in assembled condition by latches such as 38, and which contain a filter element, for example, as schematically shown in dashed line at 26a in FIG. 4, and for which further reference may be had to U.S. Pat. No. 6,402,798 showing annular filter element 26 in FIG. 3, incorporated herein by reference. As is known, dirty fluid flows into inlet 22 as shown at arrow 24, then into outer annular plenum or chamber 40, then radially inwardly through annular filter element 26a, FIG. 4, and as shown at 26 in FIG. 3 of the noted incorporated '798 patent, to be filtered by such filter element, then radially inwardly into hollow interior 42, then axially leftwardly in FIG. 4 through outlet 28 as shown at arrow 30. Also as is known, a dust ejection valve 44 may be provided, which valve is manually actuatable to an open condition to discharge collected dust from plenum or chamber 40 when the filtered fluid is air, e.g. combustion air for an internal combustion engine.

Figure 1:
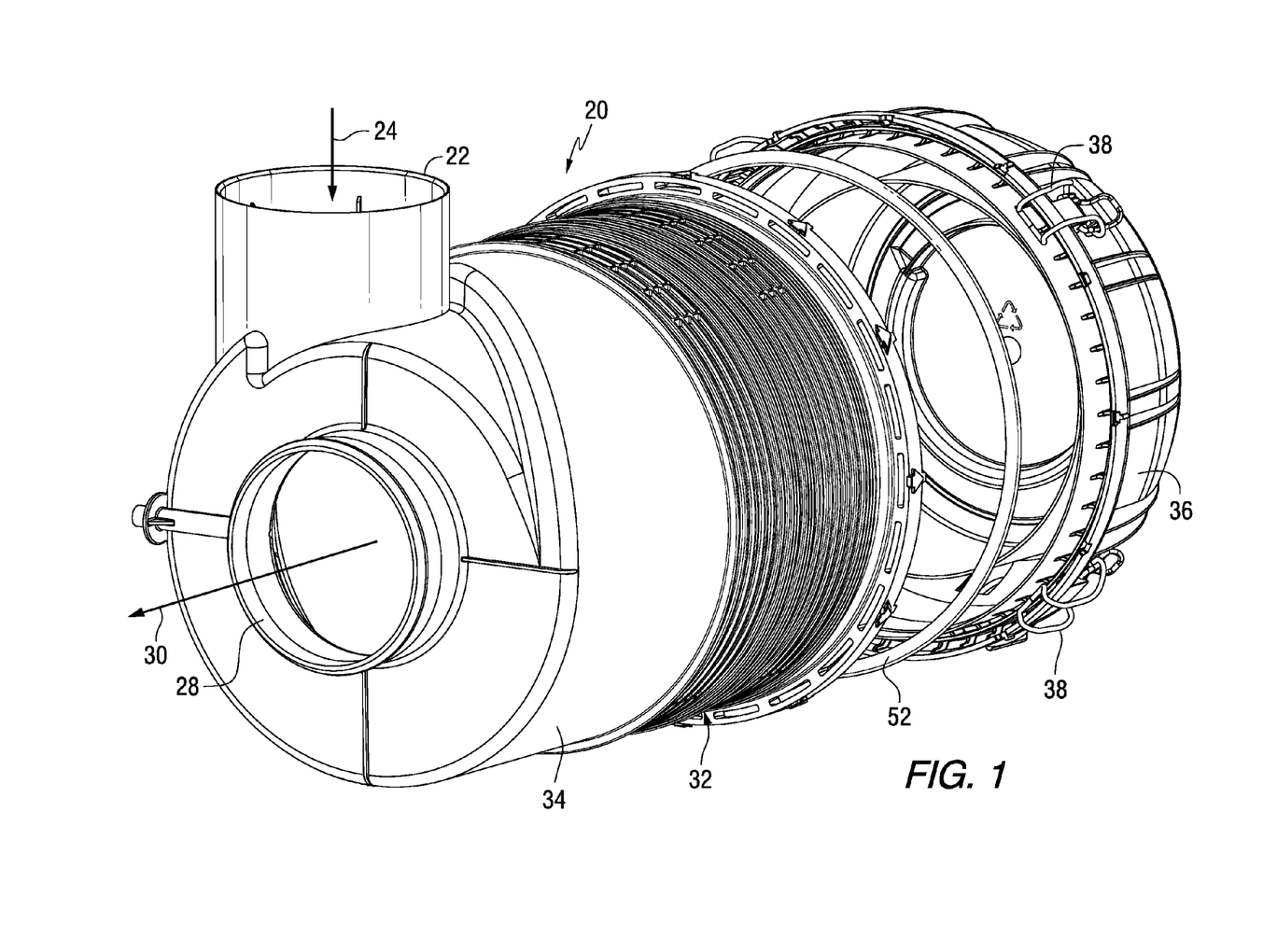
FIG. 1 is an exploded perspective view of a filter assembly in accordance with the invention.
Figure 2:
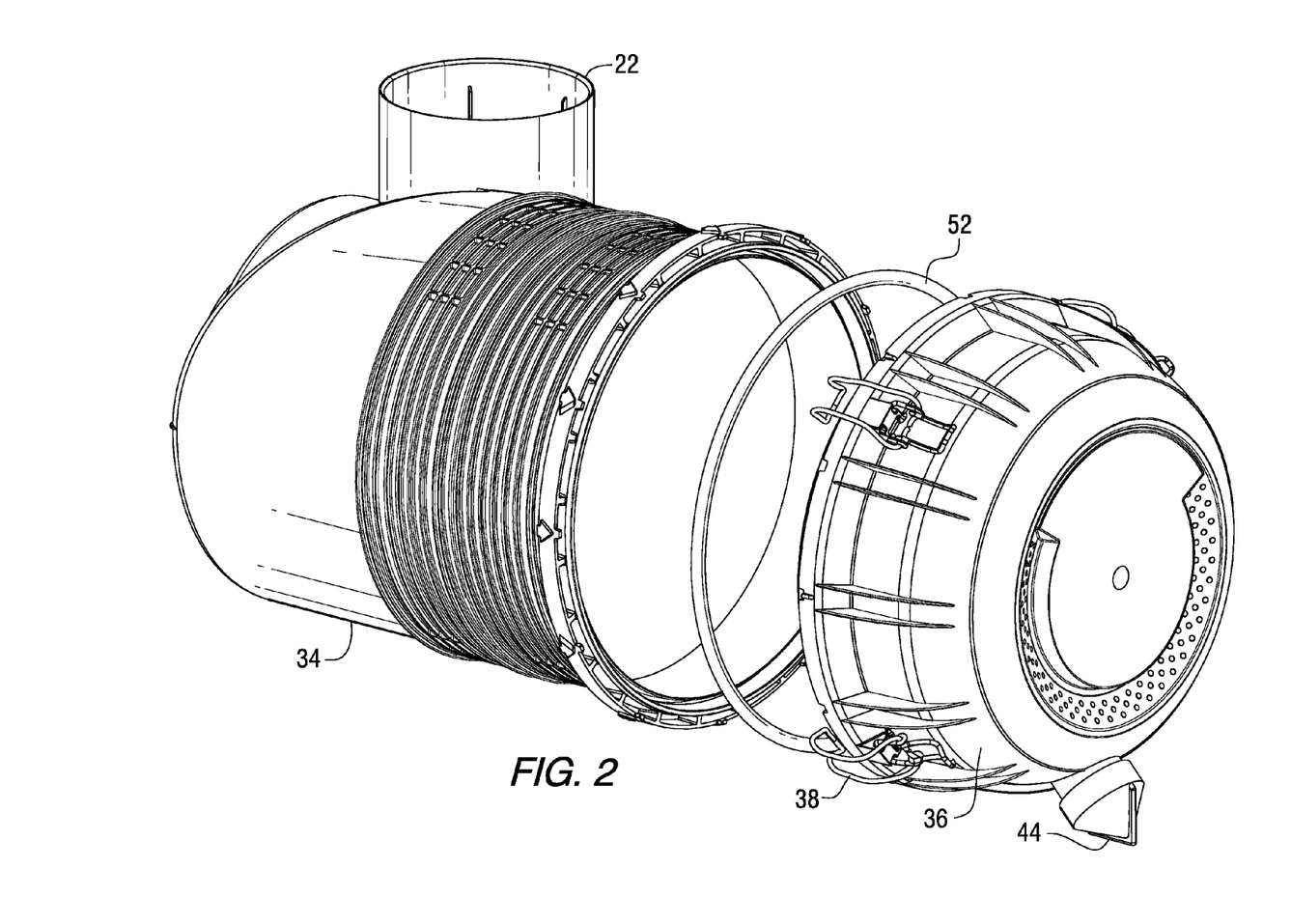
FIG. 2 is an exploded perspective view of the filter assembly of FIG. 1 from a different angle.
Figure 3:
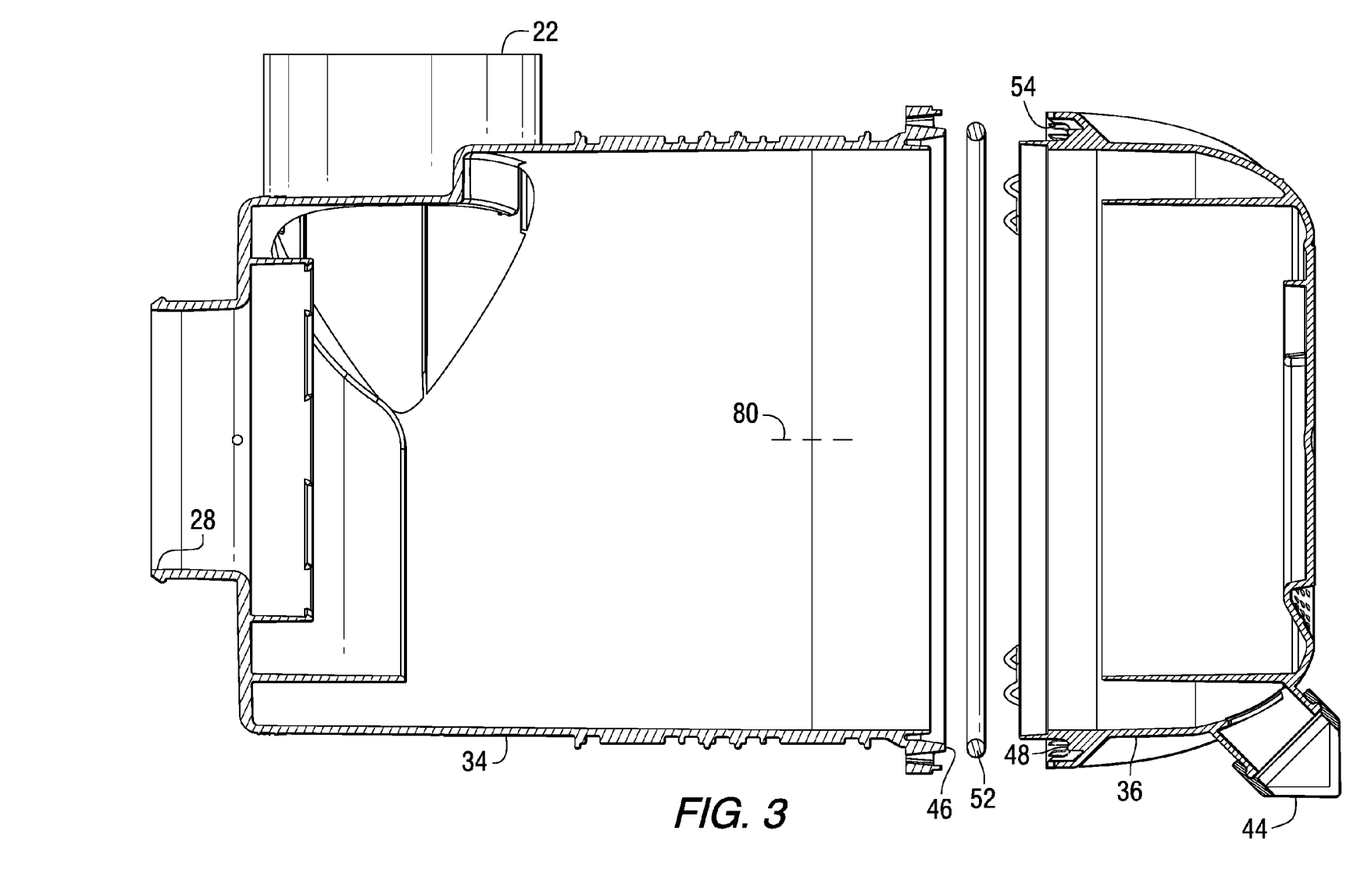
FIG. 3 is an exploded sectional view of the filter assembly of FIG. 1.
Figure 4:
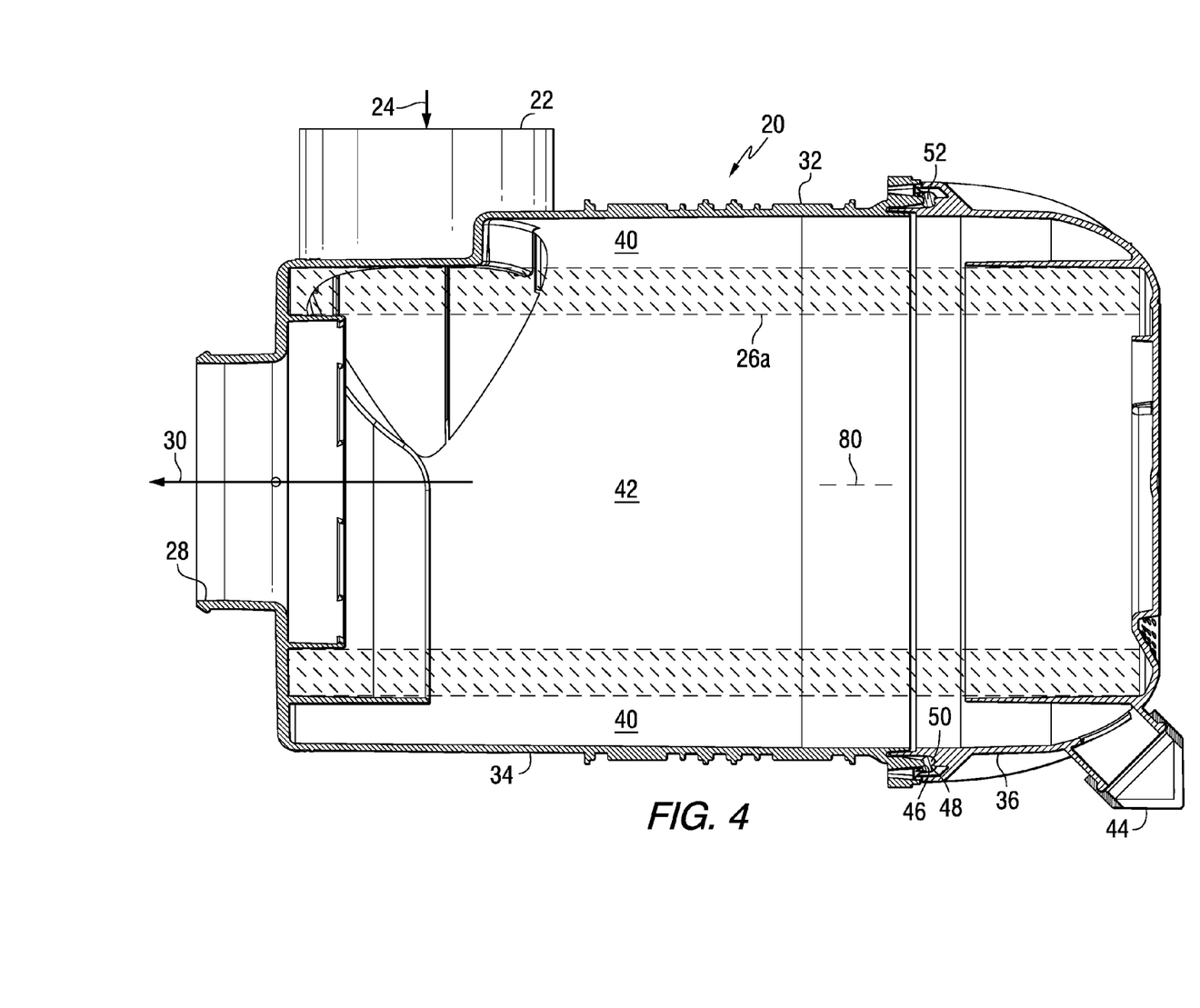
FIG. 4 is an assembled sectional view of the filter assembly of FIG. 1.
Figure 5:
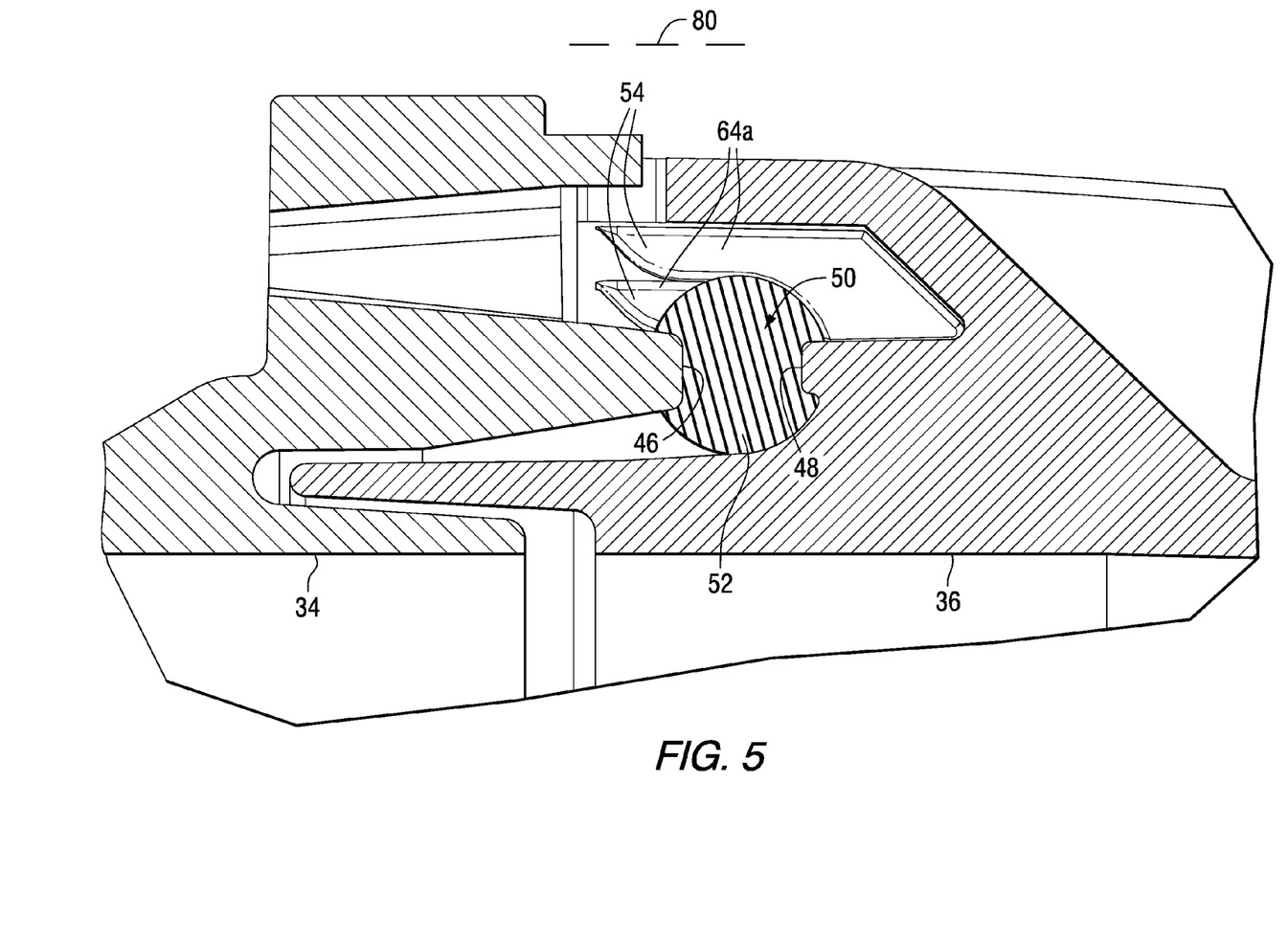
FIG. 5 is an enlarged view of a portion of FIG. 4.

Base 34 and cover 36 have respective sealing surfaces 46 and 48, FIGS. 3-5, facing each other across a space 50 therebetween. In one embodiment, a gasket 52, e.g. an annular O-ring or other gasket, is disposed in space 50 and engages each of the respective sealing surfaces 46 and 48 of base 34 and cover 36 in sealing relation. One of the base and the cover, e.g. cover 36, has a plurality of fingers 54, FIGS. 3, 5, 8, intermittently engaging gasket 52 and retaining the gasket in place on the noted one of the base and the cover, e.g. cover 36, including during assembly of base 34 and cover 36 to each other, and including upon separation of the base and cover from each other during disassembly thereof.

Sealing surface 46 of base 34, sealing surface 48 of cover 36, and gasket 52 all extend parallel to each other along a given lateral direction, e.g. peripherally circumferentially in the embodiment shown. Fingers 54 extend along a transverse direction, e.g. radially, transversely to the noted lateral direction. Fingers 54 are spaced from each other along the noted lateral direction, e.g. along direction 56 in FIG. 8.

Figure 7:
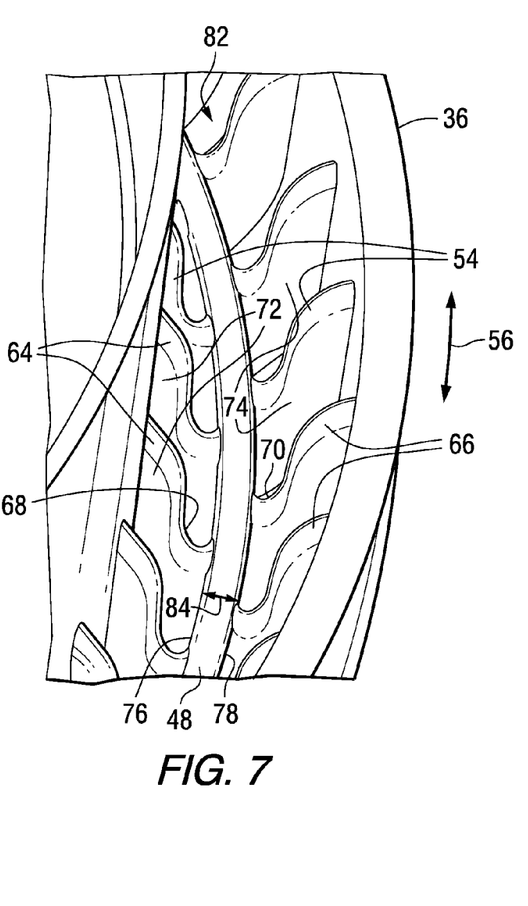
FIG. 7 is an enlarged perspective view of a portion of FIG. 3.
Figure 8:
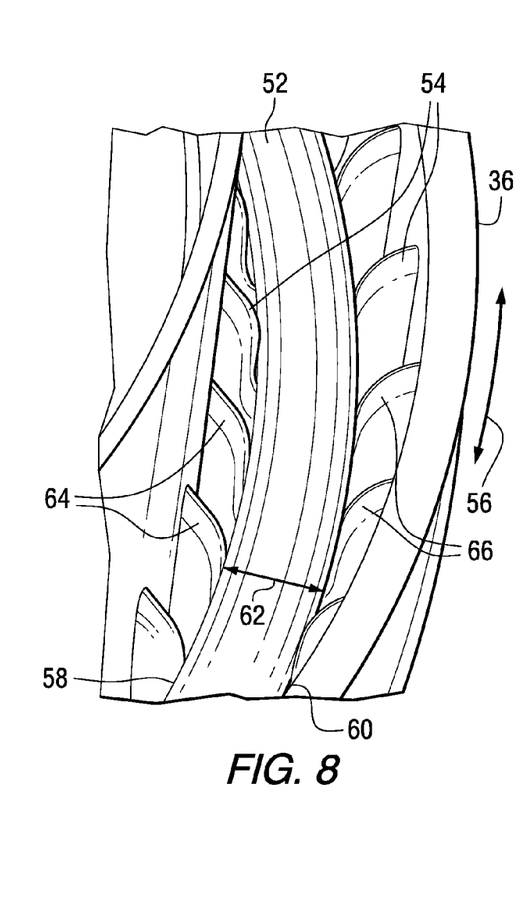
FIG. 8 is like FIG. 7 and shows another embodiment.

Gasket 52 has first and second distally oppositely facing sides 58 and 60, FIG. 8, transversely spaced from each other along transverse direction 62 by the transverse width of gasket 52 therebetween. The noted fingers are provided by first and second sets 64 and 66 of fingers 54. The first set 64 of fingers have root ends 68, FIG. 7, at first side 58 of gasket 52 and extend along a first transverse direction, e.g. leftwardly in FIGS. 7, 8 therefrom. The second set 66 of fingers have root ends 70 at second side 60 of gasket 52 and extend along a second transverse direction, e.g. rightwardly in FIGS. 7, 8 therefrom. The noted second transverse direction is opposite to the noted first transverse direction. The fingers of the first set of fingers 64 are laterally spaced from each other along lateral direction 56 by a first set of lateral gaps 72. The fingers of the second set of fingers 66 are laterally spaced from each other along lateral direction 56 by a second set of lateral gaps 74. The fingers of the first set of fingers 64 are transversely aligned, e.g. radially aligned, with the gaps of the second set of gaps 74. The fingers of the second set of fingers 66 are transversely aligned, e.g. radially aligned, with the gaps of the first set of gaps 72.

FIG. 7 shows cover 36 with gasket 52 removed, thus showing sealing surface 48. FIG. 8 shows cover 36 with gasket 52 installed and in place.

The sealing surface of one of the base and the cover, e.g. sealing surface 48 of cover 36, has first and second distally oppositely facing sides 76 and 78, FIG. 7, transversely spaced from each other along transverse direction 62 across sealing surface 48. Root ends 68 of the first set of fingers 64 extend from first side 76 of sealing surface 48. Root ends 70 of the second set of fingers 66 extend from second side 78 of sealing surface 48. The first set of fingers 64 also extend axially along an axial direction 80, FIGS. 3-5, from the root ends 68 thereof, which axial direction is upwardly and out of the page in the orientation of FIGS. 7 and 8. Axial direction 80 is normal to each of the noted lateral direction 56 and transverse direction 62. The second set of fingers 66 also extend axially along the noted axial direction 80 from the root ends 70 thereof. Cover 36 is assembled to base 34 along the noted axial direction 80. Sealing surfaces 46 and 48 of base 34 and cover 36, respectively, axially face each other across the noted space 50 therebetween and engage gasket 52 in axial sealing relation on axially distally opposite surfaces thereof. The noted first and second sides 58 and 60 of gasket 52 face transversely and distally oppositely to each other and are engaged respectively by the noted first and second sets of fingers 64 and 66.

In one embodiment, base 34 extends axially along axial direction 80 and has a circumferential perimeter mating with cover 36 in circumferential mating sealed relation at gasket 52, wherein the noted lateral extension direction 56 of gasket 52 extends circumferentially along such perimeter. In this embodiment, the noted transverse and axial extension of the first and second sets of fingers 64 and 66 form an annular pocket 82 receiving gasket 52 inserted axially thereinto.

Figure 6:
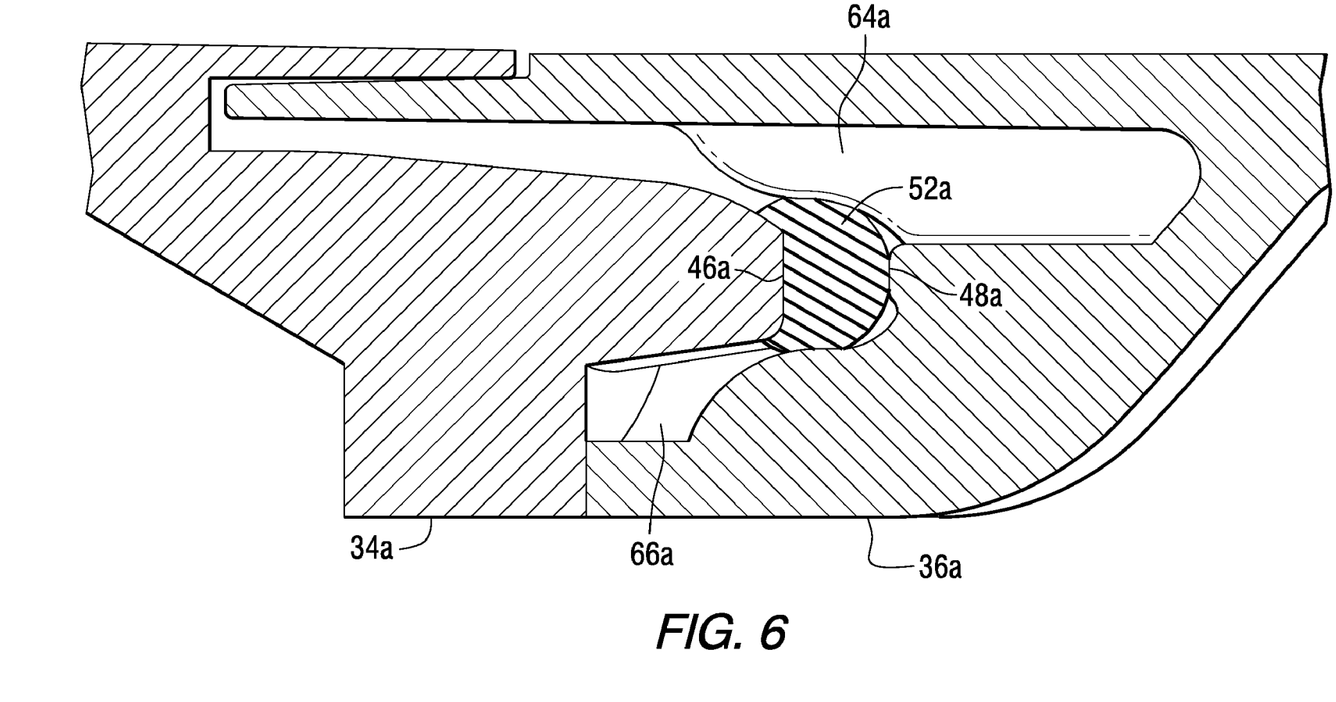
FIG. 6 is like FIG. 5 and shows another embodiment.

FIG. 6 shows another embodiment and uses like reference numerals from above, with the added postscript "a" where appropriate to facilitate understanding, including base 34*a*, cover 36*a*, sealing surface 46*a*, sealing surface 48*a*, gasket 52*a*, first set of fingers 64*a* and second set of fingers 66*a*.

In a further embodiment, gasket 52 is eliminated, for example in an air filter housing for an internal combustion engine in a vehicle not needing water-tight conditions of the filter housing. In this implementation, the noted sealing surfaces 46 and 48 of base 34 and cover 36, respectively, do not need to perform a sealing function, but instead provide respective shoulder surfaces 46 and 48 facing each other across the noted axial space 50. One of the base and the cover, e.g. cover 36, has the noted plurality of fingers 54 intermittently extending toward and along the shoulder surface of the other of the base and the cover, e.g. along shoulder surface 46 of base 34, for guiding the base and the cover together into assembled condition. Shoulder surface 46 of base 34 and shoulder surface 48 of cover 36 extend parallel to each other along a given lateral direction 56, and fingers 54 extend along a transverse direction 62 transversely to lateral direction 56. Fingers 54 are spaced from each other along the noted lateral direction 56. One of the shoulder surfaces, e.g. shoulder surface 48, has first and second distally oppositely facing sides 76 and 78 transversely spaced from each other by the transverse width 84, FIG. 7, of the noted one shoulder surface 48 therebetween. The fingers are provided by first and second sets 64 and 66 of fingers. First set of fingers 64 have root ends 68 at first side 76 of shoulder surface 48 and extend along a first transverse direction therefrom, e.g. leftwardly in FIG. 7. Second set of fingers 66 have root ends 70 at the noted second side 78 of the noted one shoulder surface 48 and extend along a second transverse direction therefrom, e.g. rightwardly in FIG. 7. The noted second transverse direction is opposite to the noted first transverse direction. The fingers of the first set of fingers 64 are laterally spaced from each other along lateral direction 56 by the noted first set of lateral gaps 72. The fingers of the second set of fingers 66 are laterally spaced from each other along lateral direction 56 by the noted second set of lateral gaps 74. The fingers of the first set of fingers 64 are transversely aligned, e.g. radially aligned, with the gaps of the second set of gaps 74. The fingers of the second set of fingers 66 are transversely aligned, e.g. radially aligned, with the gaps of the first set of gaps 72. The first set of fingers 64 also extend axially along the noted axial direction 80 from the root ends 68 thereof. Axial direction 80 is normal to each of the noted lateral direction 56 and transverse direction 62. The second set of fingers 66 also extend axially along axial direction 80 from the root ends 70 thereof. Cover 36 is assembled to base 34 along axial direction 80, and shoulder surfaces 46 and 48 of base 34 and cover 36, respectively, axially face each other across axial space 50. Base 34 extends axially along axial direction 80 and has a circumferential perimeter mating with cover 36 in circumferential mating relation. Lateral extension direction 56 extends circumferentially along the noted perimeter. The transverse and axial extension of the first and second sets of fingers 64 and 66 form the noted annular pocket 82 receiving the other of the noted shoulder surfaces, e.g. shoulder surface 46, inserted axially thereinto.

First and second sets of fingers 64, 66 provide guide structure for assembly of base 34 and cover 36. The guide structure may also provide gasket retention, e.g. of gasket 52. In one embodiment, the fingers of the first set of fingers 64 intermittently engage gasket 52 and are laterally spaced from each other by the noted lateral gaps 72 therebetween. The fingers of the second set of fingers 66 intermittently engage gasket 52 and are laterally spaced from each other by the noted second set of lateral gaps 74. Fingers 64 may be offset from fingers 66 as shown, or in another embodiment the fingers 64 may be transversely aligned, e.g. radially aligned, with fingers 66. In the gasketless version, the fingers 64 of the first set intermittently extend toward and along the noted shoulder surface of the noted other of the base and the cover, which fingers 64 are laterally spaced from each other along the noted lateral direction by the noted set of lateral gaps 72. The fingers 66 of the second set of fingers intermittently extend toward and along the noted shoulder surface of the noted other of the base and the cover, which fingers 66 are laterally spaced from each other along the noted lateral direction by the noted set of lateral gaps 74. In the gasketless version, fingers 64 may be offset from fingers 66, or in another embodiment the fingers 64 may be transversely aligned, e.g. radially aligned, with fingers 66.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A filter assembly for filtering fluid through a filter element contained in a housing having a base and a cover, said base and said cover having respective shoulder surfaces facing each other, one of said base and said cover having a plurality of fingers extending toward and along the shoulder surface of the other of said base and said cover for guiding said base and said cover together into an assembled condition, wherein said shoulder surface of said base and said shoulder surface of said cover extend parallel to each other along a given lateral direction, and said fingers extend along a transverse direction transversely to said lateral direction, said fingers are spaced from each other along said lateral direction, one of said shoulder surfaces has first and second distally oppositely facing sides transversely spaced from each other by the transverse width of said one shoulder surface therebetween, and comprising first and second sets of said fingers, said first set of fingers having root ends at said first side of said one shoulder surface and extending along a first transverse direction therefrom, said second set of fingers having root ends at said second side of said one shoulder surface and extending along a second transverse direction therefrom, said second transverse direction being opposite to said first transverse direction.

2. The filter assembly according to claim 1 wherein said fingers of said first set of fingers are laterally spaced from each other along said lateral direction by a first set of lateral gaps, said fingers of said second set of fingers are laterally spaced from each other along said lateral direction by a second set of lateral gaps, said fingers of said first set of fingers are transversely aligned with said gaps of said second set of gaps, said fingers of said second set of fingers are transversely aligned with said gaps of said first set of gaps.

3. The filter assembly according to claim 1 wherein said first set of fingers also extend axially along an axial direction from said root ends thereof, said axial direction is normal to each of said lateral and transverse directions, and said second set of fingers also extend axially along said axial direction from said root ends thereof.

4. The filter assembly according to claim 3 wherein said cover is assembled to said base along said axial direction, and said shoulder surfaces of said base and said cover axially face each other.

5. The filter assembly according to claim 4 wherein said base extends axially along said axial direction and has a circumferential perimeter mating with said cover in circumferential mating relation, said lateral extension direction extending circumferentially along said perimeter.

6. The filter assembly according to claim 5 wherein said transverse and axial extension of said first and second sets of fingers forms an annular pocket receiving the other of said shoulder surfaces inserted axially thereinto.

7. The filter assembly according to claim 6 comprising an annular gasket axially between and engaging said axially facing shoulder surfaces.

8. The filter assembly according to claim 1 wherein said fingers intermittently extend toward and along said shoulder surface of said other of said base and said cover and are laterally spaced from each other by a set of lateral gaps therebetween.

9. A cover for a filter assembly for filtering fluid through a filter element contained in a housing having a base and said cover, said base and said cover having respective shoulder surfaces facing each other, said cover having a plurality of fingers extending toward and along the shoulder surface of said base for guiding said base and said cover together into an assembled condition, and comprising a gasket between and engaging said shoulder surfaces in sealing relation, and wherein said plurality of fingers intermittently engage said gasket and retain said gasket in place on said cover during assembly of said base and said cover to each other and including upon separation of said base and said cover from each other during disassembly thereof 10. The cover according to claim 9 wherein said fingers intermittently extend toward and along said shoulder surface of said base and are laterally spaced from each other by a set of lateral gaps therebetween.

\* \* \* \* \*